Mar. 13, 1923.
R. G. W. HUNTER
1,448,220
WATER LEVEL INDICATOR FOR AUTOMOBILE RADIATORS
Filed Mar. 30, 1921
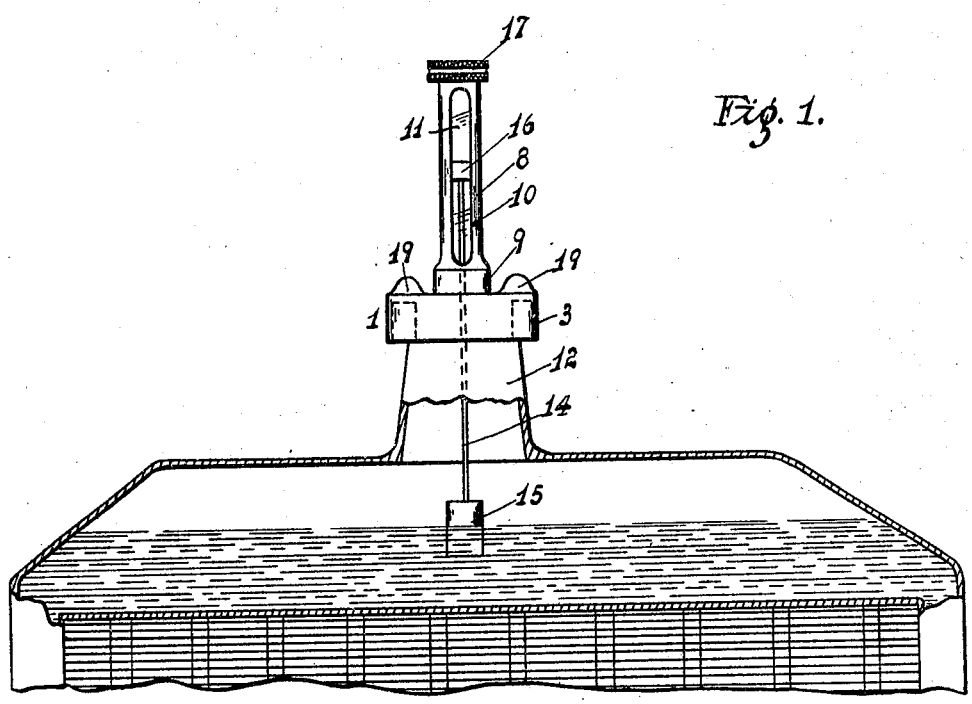
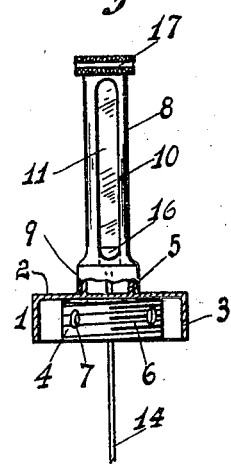
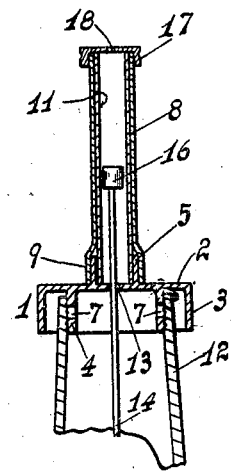
Inventor
Reginald G. W. Hunter.
By Harry Schroeder
Attorney Patented Mar. 13, 1923.

1,448,220

UNITED STATES PATENT OFFICE.

REGINALD G. W. HUNTER, OF OAKLAND, CALIFORNIA.

WATER-LEVEL INDICATOR FOR AUTOMOBILE RADIATORS.

Application filed March 30, 1921. Serial No. 456,786.

*To all whom it may concern:*

Be it known that I, REGINALD G. W. HUNTER, a citizen of the United States, residing at Oakland, in the county of Alameda and State of California, have invented certain new and useful Improvements in Water-Level Indicators for Automobile Radiators, of which the following is a specification.

My invention is a water level indicator for automobile radiators which is screwed into the inlet spout of the radiator.

Referring to the annexed drawing in which my invention is illustrated and which forms a part of this specification:

Figure 1 is a front view of an automobile radiator partly in section with my indicator screwed into the inlet spout of the radiator.

Figure 2 is an elevation of my indicator with the lower part thereof broken away and shown partly in section and partly in elevation.

Figure 3 is a vertical longitudinal section of my indicator.

In the drawing 1 indicates a base formed with an upper wall 2, an outer annular depending flange 3, an inner depending flange 4 spaced a short distance inwardly from said outer flange, and an upstanding annular flange 5 smaller in diameter than the flange 4. The inner flange 4 has an external thread 6 and a plurality of openings 7. A cylindrical tube 8 has an enlarged lower end 9 which fits over the flange 5, said tube being provided with a longitudinal slot 10. A glass tube 11 is fitted within the tube 8 and at its lower end within the flange 5. The base 1 fits over the radiator inlet spout 12, the externally threaded flange 4 of said base screwing into the internally threaded upper end of said spout. The upper wall 2 of the base 1 has a central aperture 13 within the flange 5 through which extends a rod 14 on the lower end of which is secured a float 15 and on the upper end of which is secured a piston indicator 16 which moves up and down in the glass tube 11 and shows through the slot 10 as the float 15 is raised and lowered by the varying level of the water in the automobile radiator. A knurled cap 17 screwed on the upper end of the tube 8, has an aperture 18 communicating with the interior of the glass tube 11. Upstanding ears 19 are provided on the upper wall 2 of the base 1 for screwing on or unscrewing the base from the radiator spout 12.

In unscrewing the device by the ears 19 from the radiator spout, the openings 7 when they rise above the top of the spout 12 allow the steam to escape which passes out under the flange 3 without burning one's hands.

Having described my invention, I claim:

1. A water level indicator including a base formed with a depending outer annular flange and an inner annular flange threaded to screw into the automobile radiator inlet spout and provided with openings through which steam may escape under said outer flange when unscrewing the base from said spout.

2. A water level indicator including a base formed with a depending outer annular flange and an inner annular flange threaded to screw into the automobile radiator inlet spout and provided with openings through which steam may escape under said outer flange when unscrewing the base from said spout, a cylinder upstanding from said base and provided with a longitudinal slot, a rod extending through said base into the radiator and into said cylinder, a float on the lower end of said rod and a piston indicator on the upper end of said rod which shows through said slot.

In testimony whereof I affix my signature.

REGINALD G. W. HUNTER.